(12) United States Patent
Varma et al.

(10) Patent No.: US 8,437,757 B2
(45) Date of Patent: May 7, 2013

(54) SYSTEMS FOR PROVIDING PEER-TO-PEER COMMUNICATIONS

(75) Inventors: Manish Varma, Helsinki (FI); Sami Makelainen, Helsinki (FI); Ville Aarni, Veikkola (FI); Tommy Lindgren, Vantaa (FI); Teemu Harju, Espoo (FI); Matti Vesterinen, Helsinki (FI); Javier Lafuente, Helsinki (FI); Jaakko Teinila, Espoo (FI); Harri Hakulinen, Pirkkala (FI); Heikki Kokkinen, Helsinki (FI)

(73) Assignee: Nokia Corporation (FI)

( * ) Notice: Subject to any disclaimer, the term of this patent is extended or adjusted under 35 U.S.C. 154(b) by 455 days.

(21) Appl. No.: 11/479,211

(22) Filed: Jun. 30, 2006

(65) Prior Publication Data

US 2008/0123685 A1 May 29, 2008

(51) Int. Cl.
*H04W 36/00* (2009.01)
(52) U.S. Cl.
USPC ...... 455/437; 455/432.1; 455/436; 455/552.1
(58) Field of Classification Search .......... 370/349, 370/352, 356, 466, 310.1; 709/227; 455/414.4, 455/414.1, 466, 557, 432.1, 436, 437, 552.1; 379/88.1
See application file for complete search history.

(56) References Cited

U.S. PATENT DOCUMENTS

| | | | |
|---|---|---|---|
| 6,108,704 A | | 8/2000 | Hutton et al. |
| 2002/0058504 A1* | | 5/2002 | Stanforth ............... 455/426 |
| 2003/0026289 A1* | | 2/2003 | Mukherjee et al. ........ 370/466 |
| 2004/0067761 A1 | | 4/2004 | Pyhalammi et al. |
| 2004/0139230 A1 | | 7/2004 | Kim |
| 2004/0157590 A1 | | 8/2004 | Lazaridis et al. |
| 2004/0209614 A1 | | 10/2004 | Bright et al. |
| 2005/0049001 A1* | | 3/2005 | Lazaridis ................. 455/552.1 |
| 2005/0060411 A1* | | 3/2005 | Coulombe et al. ........... 709/227 |
| 2005/0141694 A1* | | 6/2005 | Wengrovitz ............ 379/265.09 |
| 2006/0126594 A1 | | 6/2006 | Tu |
| 2006/0159079 A1* | | 7/2006 | Sachs et al. ................. 370/389 |
| 2006/0165060 A1* | | 7/2006 | Dua ............................ 370/352 |
| 2006/0215684 A1 | | 9/2006 | Capone |
| 2006/0215820 A1* | | 9/2006 | Barclay et al. ............ 379/32.04 |
| 2007/0076729 A1 | | 4/2007 | Takeda |
| 2007/0082671 A1* | | 4/2007 | Feng et al. .................. 455/436 |

(Continued)

FOREIGN PATENT DOCUMENTS

EP 1555786 7/2005

OTHER PUBLICATIONS

International Search Report for PCT Patent Application No. PCT/IB2007/052360.

(Continued)

*Primary Examiner* — Gerald Gauthier
*Assistant Examiner* — Simon King
(74) *Attorney, Agent, or Firm* — Banner & Witcoff, Ltd.

(57) ABSTRACT

Improved systems and methods for establishing peer-to-peer calls such as voice over IP calls and video over IP calls. In various embodiments of the invention, SMTP messages are exchanged between devices using a SMTP server, with the SMTP messages including IP address information. With this arrangement, the need for SIP service providers can be eliminated. In other embodiments of the present invention, SMS messages including IP address information are transmitted between devices during a GSM or other type of telephone call, enabling the call to "migrate" to a VoIP or video over IP call.

33 Claims, 8 Drawing Sheets

U.S. PATENT DOCUMENTS

| | | | |
|---|---|---|---|
| 2007/0087748 A1* | 4/2007 | Du et al. | 455/436 |
| 2007/0115991 A1* | 5/2007 | Ramani et al. | 370/392 |
| 2007/0211702 A1* | 9/2007 | Doradla et al. | 370/356 |
| 2007/0223444 A1* | 9/2007 | Foo et al. | 370/349 |
| 2007/0253407 A1* | 11/2007 | Wang et al. | 370/352 |
| 2007/0270145 A1* | 11/2007 | Feng et al. | 455/436 |
| 2007/0274271 A1* | 11/2007 | Jones et al. | 370/338 |
| 2007/0276907 A1* | 11/2007 | Maes | 709/204 |
| 2008/0096565 A1* | 4/2008 | Jin et al. | 455/437 |

OTHER PUBLICATIONS

Office Action from U.S. Appl. No. 12/599,758, mailed Nov. 28, 2011.

\* cited by examiner

SYSTEMS FOR PROVIDING PEER-TO-PEER COMMUNICATIONS

FIELD OF THE INVENTION

The present invention relates generally to peer-to-peer communication between electronic devices. More particularly, the present invention relates to the transfer of address information between peer devices in order to quickly and easily establish communication arrangements such as voice over IP (VoIP) communication.

BACKGROUND OF THE INVENTION

VoIP technology enables the establishing of voice calls where the data is sent over the Internet or other IP networks. Session initiation protocol (SIP) is currently the most important standard for VoIP and is supported in many mobile telephones. In mobile telephones supporting wireless local area network (WLAN) and SIP/VoIP capabilities, VoIP offers an inexpensive alternative to global system for mobile communications (GSM)/cellular calls. Currently, in order to be able to establish a VoIP call, both ends of the call need to be under WLAN coverage, to be permanently connected to a WLAN access point (AP) and to be subscribed to the same (or compatible) VoIP or SIP provider. Furthermore, it has traditionally been very difficult to roam from a GSM call to a less expensive VoIP call, even if WLAN is available at both ends of the call. In addition, having permanent connectivity to WLAN (and the sending of periodic messages in order to be capable of receiving calls through network address translators (NAT)/firewalls (FWs) generates a very high level of power consumption in the device.

One system that has attempted to address the above issues involves the unlicensed mobile alliance (UMA), which specifies a system for GSM-WLAN roaming. However, this system requires a subscription to a service to take advantage of this feature. Additionally, when using WLAN in this system, the telephone call is not necessarily less expensive than when VoIP is used, and it is definitely not free of charge. Still further, UMA is complex in nature and needs to be provided by operators.

In peer-to-peer (P2P) communication networks, a centralized SIP proxy and register is used to locate communication end points and maintain sessions between the end points. In Internet P2P communication networks, the locating of addresses (e.g., IP addresses) of the other users and their terminals is a significant issue that must be addressed. Traditional approaches to addressing this issue involve using such centralized SIP registers at which each of the terminals registers their address at the time of "logging on." At the same time, the users also obtain the latest registered addresses of their contacts. This information can also be obtained at the time of actual communication initiation.

In some versions, the centralized system described is maintained only for registration purposes in order to enable the end points to query location information (e.g., IP addresses, etc.) of desired members of the network. This results in client-server communication between the SIP communication client, which can be part of a personal computer, mobile telephone, or a variety of other devices, and the centralized SIP register, each time a call has to be made solely for the purpose of obtaining this location information.

Because of this process as described above, devices must rely upon SIP service providers for call setup. This process also leads to the reliance of the whole communication system on the availability of the SIP register at any point whenever communication needs arise. Furthermore, in this arrangement, individual clients also need to have some type of agreement, such as a free or paid subscription, with a service provider in order to take advantage of the system. Lastly, this arrangement somewhat limits the range of other peers that the subscribers of one provider can communicate with, as the identity of the peer must necessarily be available in the same provider's register or in the register of a partner service provider.

SUMMARY OF THE INVENTION

The present invention provides for various systems for establishing P2P communication, such as VoIP and video calls, between devices without the use of SIP servers/providers using available "parallel" mechanisms such as electronic mail or SMS messages to transmit the required IP addresses. Various embodiments of the present invention involve a system where a communication client can interact with each other using simple mail transfer protocol (SMTP) protocol to directly send lists of IP addresses/port candidates to its peers. As a result of this capability, a communication network of the present invention is based strictly on peer-to-peer communication, with no centralized server, except for existing SMTP email servers, or nodes involved. The SMTP servers involved are not specific to this network, but instead comprise general email servers already existing on the Internet. With this system, the reliance of the communication network on the SIP service providers is removed.

With these embodiments of the present invention, peer-to-peer network clients do not have to rely on centralized registers for finding peers. As a result, performance is significantly improved. In addition, because there is no subscription service required (except for the existing email subscriptions that clients may have for regular email usage) and no service provider, the present invention does not require any mechanism that could be used to track, control, and/or charge the users of such network. Additionally, the present invention allows for devices to "hole-punch" through NATs/FWs, regardless of which side each device is on, because both devices are able to obtain each others' IP address before starting the desired session.

The present invention also includes a software component running in mobile devices that supports both GSM (voice and short messaging service (SMS)) and WLAN/VoIP. The software enables automatic roaming whenever there is free network connectivity available, for example WLAN or flat fee 3G data connectivity, to roam from a cellular call to a VoIP call. According to various embodiments of the invention, devices do not need to be subscribed to any SIP or VoIP provider. Various embodiments can also be used with non-GSM cellular systems as well.

With the ability to roam between GSM and WLAN, the present invention enables the providing of inexpensive or even free calls when the devices at issue possess acceptable WLAN coverage. This arrangement also results in improved power consumption compared to other systems that enable WLAN and VoIP services. Such a system is also secure due to the SMS-based authentication, and there is no dependency required on SIP servers or providers. Similarly, with certain embodiments of the present invention, there is no need for the IP addresses of other users, as a person's telephone number is sufficient to establish and maintain a connection. Furthermore, devices operating in accordance with various embodiments of the present invention do not require "always on" IP connectivity, while at the same time, the improved integration of GSM and VoIP aids in the deployment of VoIP technology.

Different embodiments of the present invention can also aid in preventing unwanted incoming traffic of various forms, and available NAT traversal techniques can be implemented on top of the present invention.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
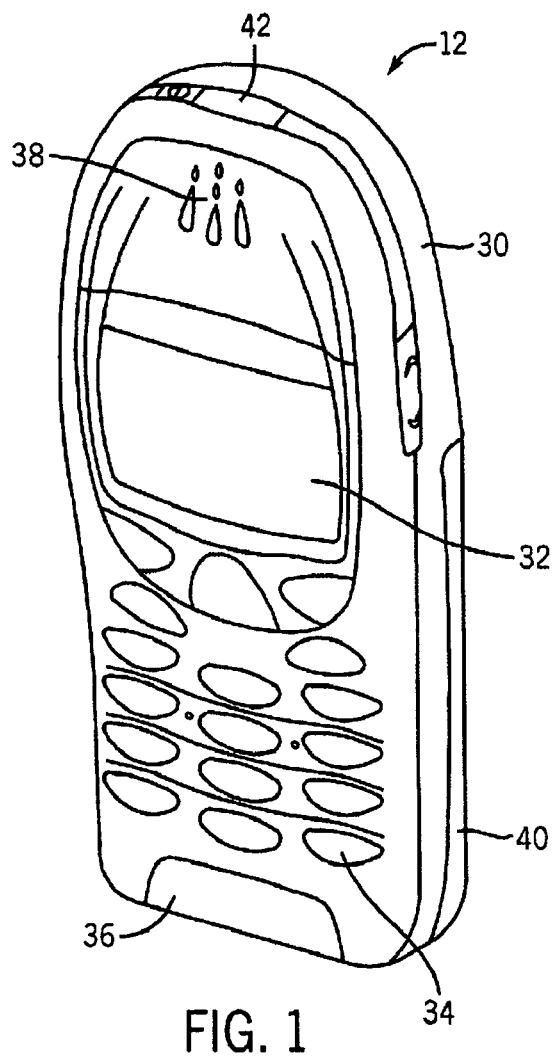
FIG. 1 is a perspective view of a mobile telephone that can be used in the implementation of the present invention.
Figure 2:
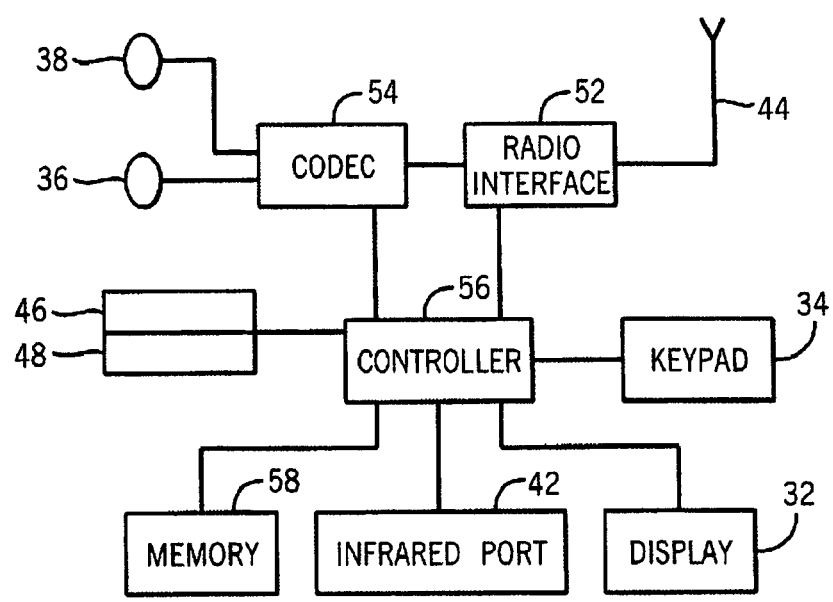
FIG. 2 is a schematic representation of the telephone circuitry of the mobile telephone of FIG. 1.

FIGS. 1 and 2 show one representative electronic device 12 within which the present invention may be implemented. It should be understood, however, that the present invention is not intended to be limited to one particular type of electronic device 12 or other electronic device. The electronic device 12 of FIGS. 1 and 2 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The electronic device 12 of FIGS. 1 and 2 and other communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Various embodiments of the present invention involve a system where a communication client can interact using SMTP protocol to directly send lists of IP addresses/port candidates to its peers. As of a result of this capability, a communication network of the present invention is based strictly on peer-to-peer communication, with no centralized server, except for existing SMTP email servers, or nodes involved. The SMTP servers involved are not specific to this network, but instead comprise general email servers already existing on the Internet. With this system, the reliance of the communication network on the SIP service providers is removed.

Various embodiments of the present invention involve incorporating a SMTP client into a P2P communication client. Each P2P communication client is capable of direct communication sessions with another party once it knows the address of the other party. The SMTP client is used by each P2P client to transmit its list of IP addresses/port candidates to any desired devices (i.e., all of its 'buddies') at the time of login. The SMTP client is configured to use any generic SMTP server in the Internet domain with which the user of the client has access (i.e., any SMTP server with which the SMTP has an email account). For example, a client device can be configured to use email provider's server for the user at the user's email address. In different embodiments of the present invention, any other email servers in the public domain may be used.

Figure 3:
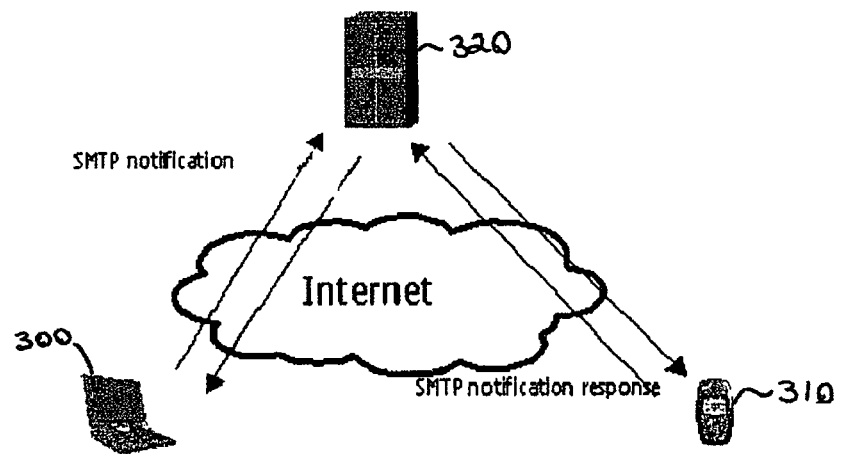
FIG. 3 is a representation of a system where various client devices exchange IP address information using SMTP notifications according to various embodiments of the present invention.

FIG. 3 is a representation of a system where various client devices exchange IP address information using SMTP notifications according to various embodiments of the present invention. The system in FIG. 4 includes a first client device 300, a second client device 310, and a SMTP server 320 (a public domain SMTP server in one embodiment).

Figure 4:
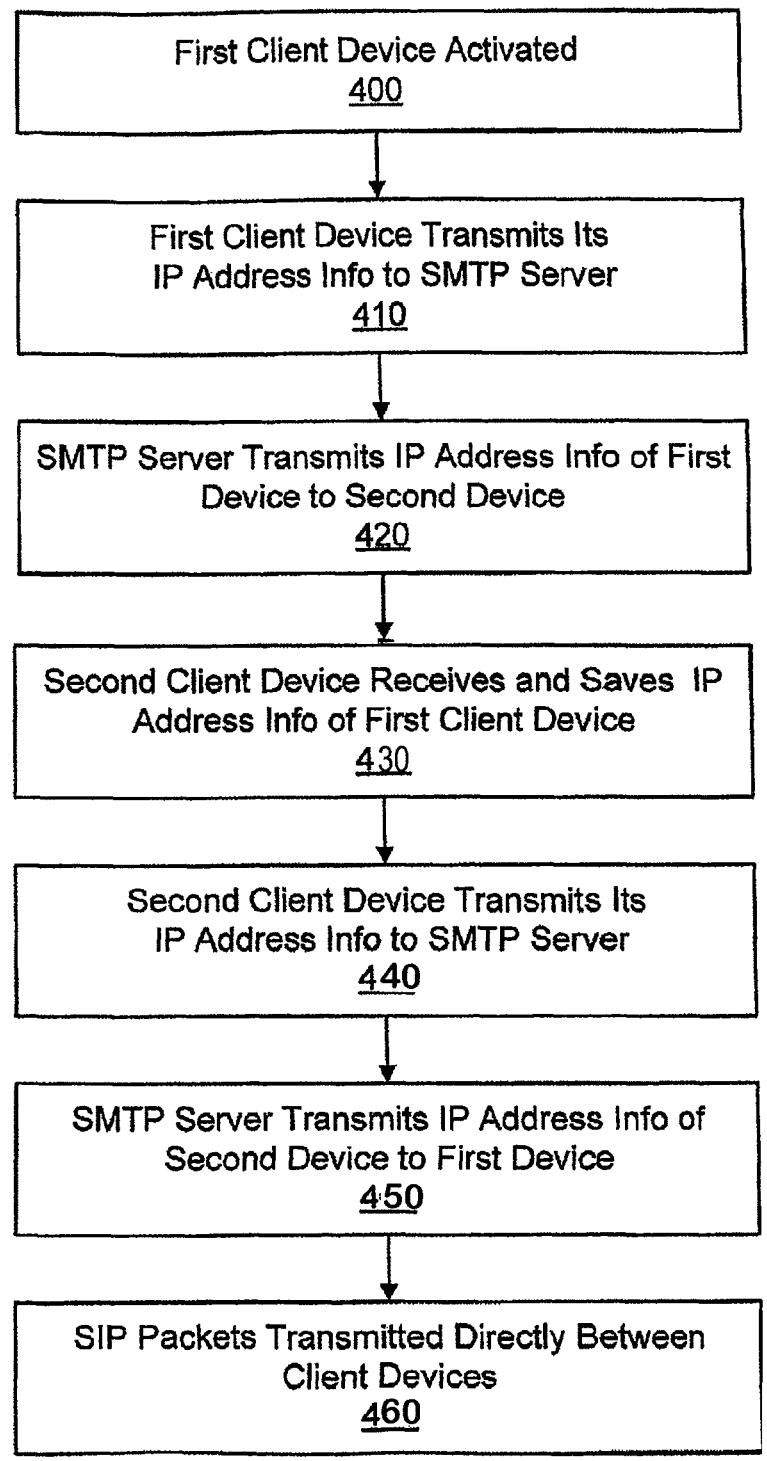
FIG. 4 is a flow chart showing the process by which IP address information is exchanged using SMTP notifications.
Figure 5:
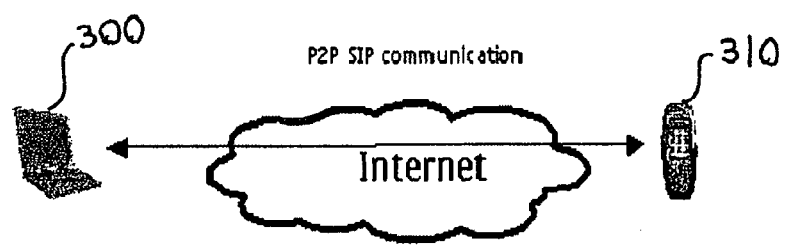
FIG. 5 is a representation showing direct peer-to-peer SIP communication between client devices once address information of each device has been received by the other device.

FIG. 4 is a flow chart showing the interaction among the first client device 300, the second client device 310, and the SMTP server 320. At 400, the first client device 300 is activated or a user logs in to the first client device 300. At 410, the first client device 300 transmits its list of IP addresses/port candidates to the SMTP server 320, which in turn transmits this information to the second client device 310 with whom the first client device 300 has interchanged its communication information (e.g., SIP ID, SMTP ID, etc.) in its list using its SMTP client. The transmission from the SMTP server 320 to the second client device 310 is represented at 420 in FIG. 4. If the second client device 310 is logged on, it receives the SMTP notification that originated with the first client device 300 and stores the first client device's contact address (IP address) that is provided within the notification at 430. At 440, the second client device 310 transmits a notification response to the SMTP server 320, which relays the response to the first client device 300 at 450. The response includes the IP address of the second client device 310. The first and second client devices 300 and 310 can therefore save the address information of the other respective client device. Thus, the SMTP mechanism depicted herein can be used by the client devices to update each other's contact information. When the first client device 300 wants to make a peer-to-peer call with the second client device 310, the SIP client directly transmits SIP signalling packets to the notified IP address of the second client device 310, as represented at 460. This process is also depicted in FIG. 5.

In another embodiment, a client can possess back-up SMTP connection settings, in which case it can use multiple or best-possible SMTP connections for transmitting the list of IP addresses/port candidates. In still another embodiment of the present invention, instead of using SMTP clients integrated with P2P clients, an SMTP server can be implemented in the SIP client implementation. This serves to remove the reliance of the system on the performance and reliability of the configured public or private SMTP servers.

The present invention also includes a software component running in mobile devices that supports both GSM (voice and SMS) and WLAN/VoIP. The software enables automatic roaming from a GSM call to a VoIP call when both devices are in WLAN coverage. According to various embodiments of the invention, devices do not need to be subscribed to any SIP or VoIP provider. Instead, SMS messages are automatically transmitted and processed in the background of the client devices at issue in order to inform the devices about WLAN availability and the devices' respective IP addresses. It should be noted that, although embodiments herein are described in terms of WLAN network coverage, the present invention could also be implemented in other networks as well.

Figure 6:
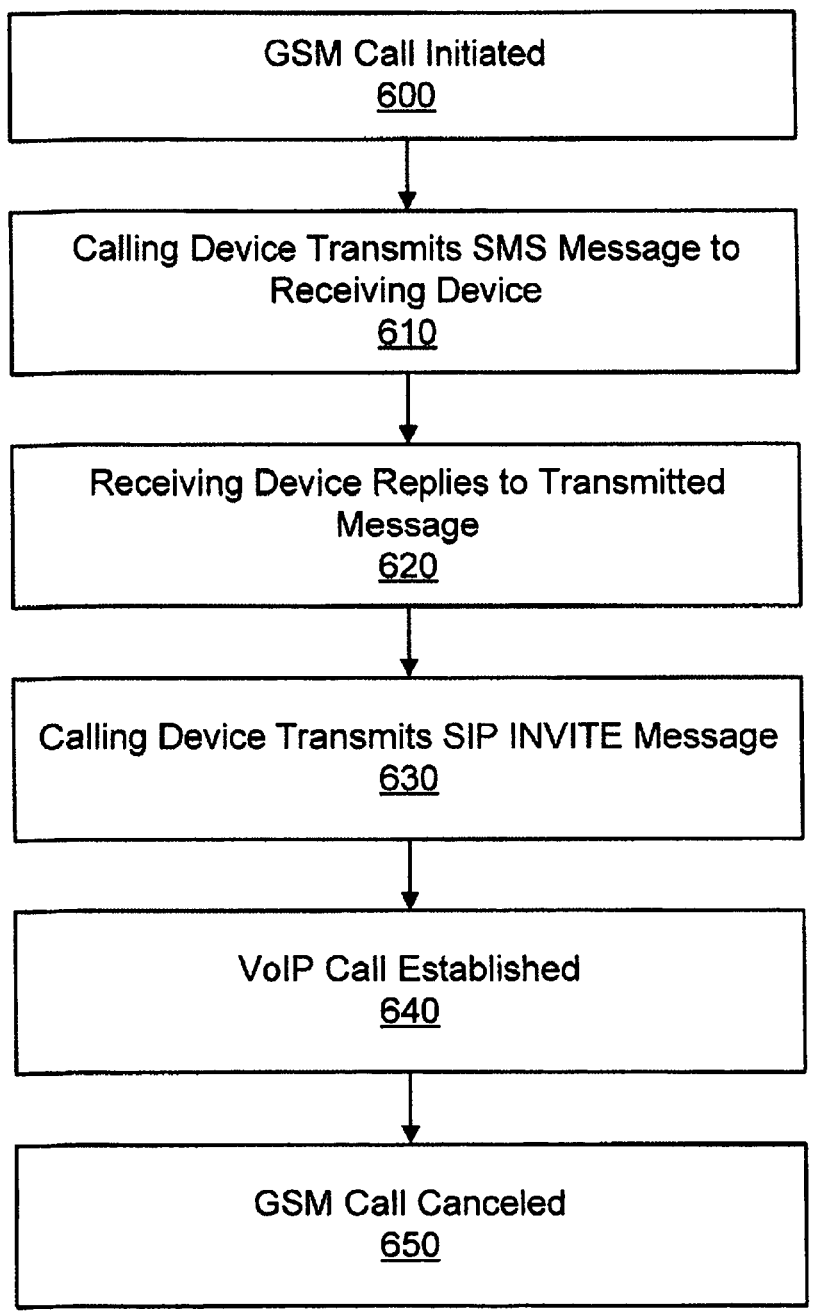
FIG. 6 is a flow chart showing a process by which SMS messages are used to set up a VoIP call to replace a GSM call according to one embodiment of the present invention.

FIG. 6 is a flow chart showing the process by which a GSM call can be essentially converted to a VoIP call according to various embodiments of the present invention. At 600 in FIG. 6, a GSM call is initiated between a calling device and a receiving device. If the calling device is in WLAN coverage, the calling device transmits an SMS message to the receiving device at 610 via the standard GSM framework. This SMS message includes a list of the calling device's IP addresses/port candidates, with each address in the form of a SIP uniform resource identifier (URI) (e.g., sip:username@45.67.89.10). In the event that some of the devices are behind NATs, Simple Traversal of UDP Through NATs (STUN) protocol can be used to find the outbound IP address to which the SMS should be transmitted. IGDs may also be used for this purpose.

If the receiving device is also under WLAN coverage, then it automatically activates its WLAN interface and replies with its own SIP URI/IP address at 620. This reply is also in the form of an SMS message. If the calling device receives the receiving device's SMS reply, then the calling device knows that both devices are in WLAN coverage. Therefore, the calling device proceeds to transmit a SIP INVITE message directly to the other device's IP address, with no SIP Proxy used, in order to initiate a VoIP call at 630. The VoIP call is fully established at 640. Once the VoIP call (or other media call over IP) is established, the GSM call is cancelled at 650, with the users not noticing a substantial interruption, as the SMS exchange and VoIP call setup occurs in the background of the devices. In fact, it is possible that the conversion to a VoIP call occurs even before the recipient of the original GSM call has answered the call.

Figure 7:
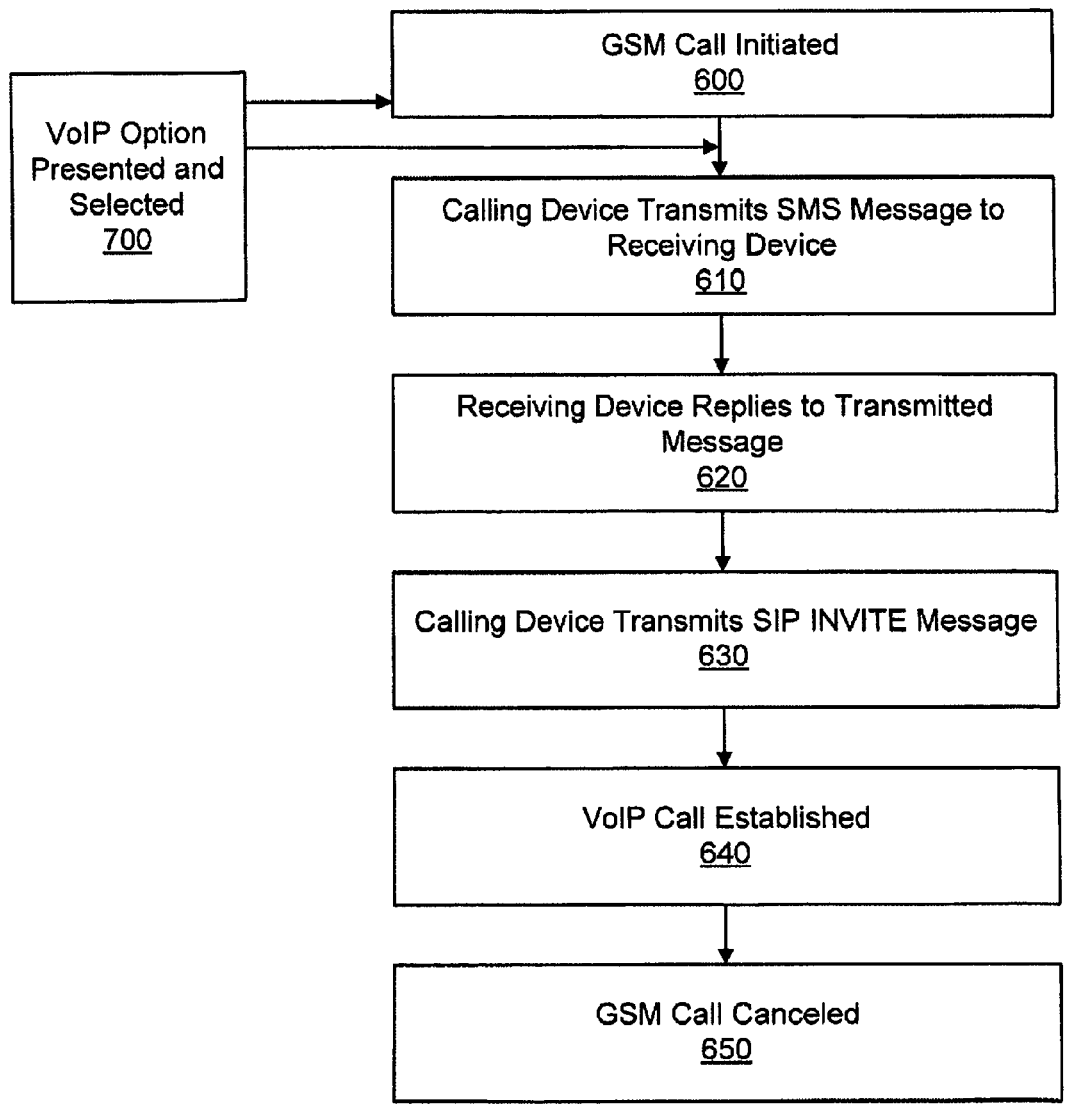
FIG. 7 is a flow chart showing a process by which SMS messages are used to set up a VoIP call to replace a GSM call according to another embodiment of the present invention.

The following are a number of potential variations for the implementation of the present invention. In one embodiment, roaming is not triggered automatically. Instead, the "roaming" option is exhibited to a user through a device's user interface when in WLAN coverage, providing the user with the opportunity to request VoIP functionality if so desired. The providing of this option and its selection is depicted at 700 in FIG. 7 and, depending upon the capabilities of the device, can occur before a call is made and/or during the call.

Figure 8:
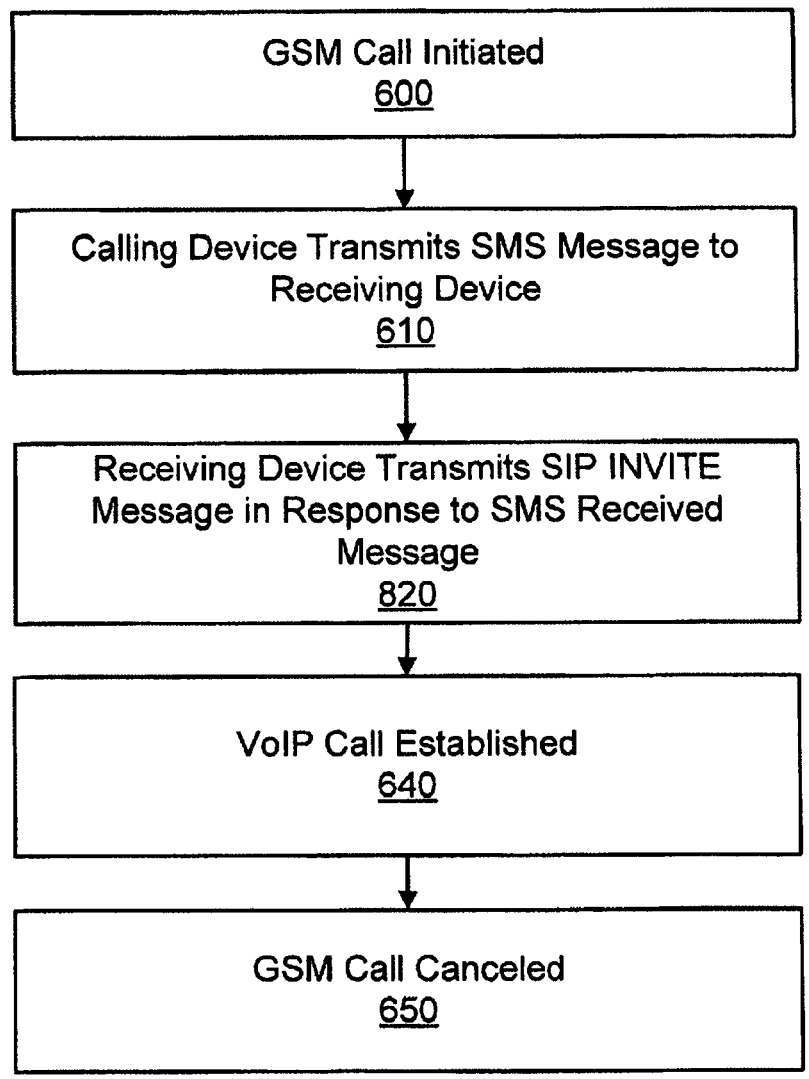
FIG. 8 is a flow chart showing a process by which SMS messages are used to set up a VoIP call to replace a GSM call according to still another embodiment of the present invention.

Another embodiment involves eliminating the reply message transmitted by the receiving device. In this embodiment and as depicted in FIG. 8, instead of replying with its own SMS message, the receiving device responds to the calling device's SMS message with a SIP INVITE to the calling device at 820. This allows the devices to more quickly roam to a VoIP connection, saving the "cost" of a SMS message.

In yet another embodiment, in addition to the IP/SIP URI, the initial SMS can contain a text message such as: "XXX is trying to establish a VoIP call with you," with an instruction or request for the receiving device to obtain the appropriate software at a certain location. In this embodiment, if the receiving device exhibits this message, then the user knows that the receiving device does not have the appropriate software. If the receiving device has the correct software, this message can be processed and deleted in the background so that the user does not see it.

In still another embodiment of the invention, the calling device can also possess a certain degree of intelligence in order to make a decision as to whether a SMS should be sent. This decision can be based upon information available to the device. For example, the calling device's phonebook could store information as to whether the receiving device is WLAN-capable. The decision can also be based upon whether there have been WLAN connections to the receiving party in prior calls. Alternatively, presence information can be used to notify another device that the device at issue is in WLAN coverage. With each of these mechanisms, the likelihood of transmitting unnecessary SMS messages can be reduced.

In yet another embodiment, the present invention can be implemented such that the SMS signalling is used only to add a SIP video session, with the voice session remaining on the cellular call. In this particular embodiment, SMS messages are used to exchange IP address information as discussed above. However, this IP address information is only used to transfer video data, e.g., over a 3G system such as in standard videosharing or WLAN if available. In this embodiment, the cellular call continues in its original state without roaming.

In addition to the above, it should also be noted that the present invention is not limited to SIP, but instead can be used in conjunction with other IP-based protocols. In addition, the present invention is not strictly limited to voice calls, as the invention can also be used with video calls for example. A wide variety of cellular technologies, including GSM, CDMA, WCDMA, and other technologies can also be used in conjunction with the present invention.

In addition to the above, the devices involved in a GSM call can use mechanisms other than SMS messages to exchange information for a VoIP call. For example, the initiation messages can be transmitted over the GSM voice connection, being coded in a manner similar to that used in conventional modems. Another option involves using network signalling (ringing) to initiate the VoIP call. This can be used for nodes which know each other beforehand and can locate the other user using DNS or SIP servers. In this situation, the software implementing the present invention recognizes that the incoming call belongs to a "VoIP partner," and thereafter attempts to establish a VoIP call with the other party. Pre-stored information regarding the calling party such as the SIP address, DNS name or permanent IP address is utilized to establish the call. The receiving and calling parties may obtain notification that it is possible to establish a VoIP (or video over IP) call as well, along with an inquiry as to whether the party would like to establish such as call.

The software used in conjunction with various embodiments of the present invention can be configured to attempt roaming from WLAN to VoIP with only certain telephone numbers, for example only designated numbers stored in a device's phonebook, which are likely to have the required software for successful implementation.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method comprising:
   initiating a cellular call with a second client device;
   determining if an alternate communication channel is available;
   if it is determined that the alternate communication channel is available, transmitting a first message to the second client device, the first message including a first list of at least one candidate internet protocol address for a first client device;
   in response to the transmitted message, receiving a second message from the second client device; and
   establishing a peer-to-peer call over a network connection with the second client device using one of the candidate internet protocol addresses for the first client device and information included in the second message, wherein the first message includes a text message for exhibition at the second client device asking a user of the second client device to obtain necessary software to complete the peer-to-peer call if necessary.

2. The method of claim 1, wherein the peer-to-peer call comprises a voice over internet protocol call.

3. The method of claim 1, wherein the peer-to-peer call comprises a video over internet protocol call.

4. The method of claim 1, wherein the first message is transmitted according to simple mail transfer protocol and is relayed to the second client device through a simple mail transfer protocol server.

5. The method of claim 4, wherein the second message is transmitted according to simple mail transfer protocol and is relayed to the first client device through the simple mail transfer protocol server.

6. The method of claim 1, wherein the second message includes a second list of at least one candidate internet protocol address of the second client device.

7. The method of claim 1, wherein the first message is transmitted in response to the first client device being activated.

8. The method of claim 1, wherein the second message comprises a short messaging service message and includes a second list of at least one candidate internet protocol address for the second client device.

9. The method of claim 8, further comprising, after receiving the second message, transmitting a session initiation protocol INVITE message to the second client device, after which the peer-to-peer call is initiated.

10. The method of claim 1, wherein the second message comprises a session initiation protocol INVITE message directed to the first client device.

11. The method of claim 1, wherein the transmission of the first message occurs in response to a determination by the first client device that the second client device has previously participated in peer-to-peer transmission with the first client device over a network connection.

12. A method comprising:
    initiating a cellular call with a second client device;
    determining if an alternate communication channel is available;
    if it is determined that the alternate communication channel is available, transmitting a first message to the second client device, the first message including a first list of at least one candidate internet protocol address for a first client device;
    in response to the transmitted message, receiving a second message from the second client device;
    providing a user with an option of establishing a peer-to-peer call over a network connection with the second client device using one of the candidate internet protocol addresses for the first client device and information included in the second message, wherein the first message includes a text message for exhibition at the second client device asking a user of the second client device to obtain necessary software to complete the peer-to-peer call if necessary; and
    dropping the cellular call.

13. The method of claim 12, wherein the cellular call comprises a global system for mobile communications call.

14. A method comprising:
    initiating a cellular call with a second client device;
    determining if an alternate communication channel is available;
    if it is determined that the alternate communication channel is available, transmitting a first message to the second client device, the first message including a first list of at least one candidate internet protocol address for a first client device;
    in response to the transmitted message, receiving a second message from the second client device;
    establishing a peer-to-peer call over a network connection with the second client device using one of the candidate internet protocol addresses for the first client device and information included in the second message, wherein the first message includes a text message for exhibition at the second client device asking a user of the second client device to obtain necessary software to complete the peer-to-peer call if necessary; and
    after establishing the peer-to-peer call, maintaining the cellular call for audio communication and using the peer-to-peer call for video communication.

15. An apparatus comprising:
    a memory unit configured to store computer code; and
    a processor, operatively connected to the memory, the processor configured to execute the computer code to control the apparatus to:
    initiate a cellular call with a receiving client device;

determine if an alternate communication channel is available;

if it is determined that the alternate communication channel is available, transmit a first message to the receiving client device, the first message including a first list of at least one candidate internet protocol address for a calling client device;

in response to the transmitted message, receive a second message from the receiving client device; and establish a peer-to-peer call over a network connection with the receiving client device using one of the candidate internet protocol addresses for the calling client device and information included in the second message wherein the first message includes a text message for exhibition at the receiving client device asking a user of the receiving client device to obtain necessary software to complete the peer-to-peer call if necessary; and drop the cellular call.

16. A method comprising:

receiving a cellular call from a first client device;

determining if an alternate communication channel is available;

if it is determined that the alternate communication channel is available, receiving a first message from the first client device, the first message including a first list of at least one candidate internet protocol address for the first client device;

in response to the received message, transmitting a second message to the first client device;

establishing a peer-to-peer call over a network connection with the first client device using one of the candidate internet protocol addresses for the first client device and information included in the second message, wherein the first message includes a text message for exhibition at a second client device asking a user of the second client device to obtain necessary software to complete the peer-to-peer call if necessary; and dropping the cellular call.

17. The method of claim 16, wherein the first message is transmitted according to simple mail transfer protocol and is relayed from the first client device through a simple mail transfer protocol server.

18. The method of claim 17, wherein the second message is transmitted according to simple mail transfer protocol and is relayed to the first client device through the simple mail transfer protocol server.

19. The method of claim 16, wherein the second message includes a second list of at least one candidate internet protocol address of a second client device.

20. The method of claim 16, wherein the second message comprises a short messaging service message and includes a second list of at least one candidate internet protocol address for a second client device.

21. The method of claim 20, further comprising, after transmitting the second message, receiving a session initiation protocol INVITE message from the first client device, after which the peer-to-peer call is initiated.

22. The method of claim 16, wherein the second message comprises a session initiation protocol INVITE message directed to the first client device.

23. An apparatus comprising:

a memory unit configured to store computer code; and a processor, operatively connected to the memory, the processor configured to execute the computer code to control the apparatus to:

receive a cellular call from a calling client device;

determine if an alternate communication channel is available;

if it is determined that the alternate communication channel is available, receive a first message from the calling client device, the first message including a first list of at least one candidate internet protocol address for the calling client device;

in response to the received message, transmit a second message to the calling client device;

establish a peer-to-peer call over a network connection with the calling client device using one of the candidate internet protocol addresses for the calling client device and information included in the second message, wherein the first message includes a text message for exhibition at a receiving client device asking a user of the receiving client device to obtain necessary software to complete the peer-to-peer call if necessary; and drop the cellular call.

24. A method comprising:

initiating a cellular call with a second client device;

determining if an alternate communication channel is available;

if it is determined that the alternate communication channel is available, transmitting a first message to the second client device, the first message including a first list of at least one candidate internet protocol address for a first client device;

in response to the transmitted message, receiving a second message from the second client device;

establishing a peer-to-peer call over a network connection with the second client device using one of the candidate internet protocol addresses for the first client device and information included in the second message, wherein the first message is transmitted according to simple mail transfer protocol and is relayed to the second client device through a simple mail transfer protocol server;

wherein the first message includes a text message for exhibition at the second client device asking a user of the second client device to obtain necessary software to complete the peer-to-peer call if necessary; and dropping the cellular call.

25. The method of claim 24, wherein the second message is transmitted according to simple mail transfer protocol and is relayed to the first client device through the simple mail transfer protocol server.

26. An apparatus comprising:

a memory unit configured to store computer code; and a processor, operatively connected to the memory, the processor configured to execute the computer code to control the apparatus to:

initiate a cellular call with a receiving client device;

determine if an alternate communication channel is available;

if it is determined that the alternate communication channel is available, transmit a first message to the receiving client device, the first message including a first list of at least one candidate internet protocol address for a calling client device;

in response to the transmitted message, receive a second message from the receiving client device;

establish a peer-to-peer call over a network connection with the receiving client device using one of the candidate internet protocol addresses for the calling client device and information included in the second message, wherein the first message is transmitted according to simple mail transfer protocol and is relayed to the client through a simple mail transfer protocol server;
wherein the first message includes a text message for exhibition at the receiving client device asking a user of the receiving client device to obtain necessary software to complete the peer-to-peer call if necessary; and
drop the cellular call.

27. The apparatus of claim 26, wherein the second message is transmitted according to simple mail transfer protocol and is relayed to the calling client device through the simple mail transfer protocol server.

28. A method comprising:
receiving a cellular call from a first client device;
determining if an alternate communication channel is available;
if it is determined that the alternate communication channel is available, receiving a first message from the first client device, the first message including a first list of at least one candidate internet protocol address for the first client device;
in response to the received message, transmitting a second message to the first client device;
establishing a peer-to-peer call over a network connection with the first client device using one of the candidate internet protocol addresses for the first client device and information included in the second message,
wherein the first message is transmitted according to simple mail transfer protocol and is relayed to the client through a simple mail transfer protocol server;
wherein the first message includes a text message for exhibition at a second client device as a user of the second client device to obtain necessary software to complete the peer-to-peer call if necessary; and
dropping the cellular call.

29. The method of claim 28, wherein the second message is transmitted according to simple mail transfer protocol and is relayed to the first client device through the simple mail transfer protocol server.

30. An apparatus comprising:
a memory unit configured to store computer code; and a processor, operatively connected to the memory, the processor configured to execute the computer code to control the apparatus to:
receive a cellular call from a calling client device;;
determine if an alternate communication channel is available;
if it is determined that the alternate communication channel is available, receive a first message from the calling client device, the first message including a first list of at least one candidate internet protocol address for the calling client device;
in response to the transmitted message, transmit a second message to the calling client device;
establish a peer-to-peer call over a network connection with the calling client device using one of the candidate internet protocol addresses for the calling client device and information included in the second message,
wherein the first message is transmitted according to simple mail transfer protocol and is relayed to the client through a simple mail transfer protocol server;
wherein the first message includes a text message for exhibition at a receiving client device asking a user of the receiving client device to obtain necessary software to complete the peer-to-peer call if necessary; and
drop the cellular call.

31. The apparatus of claim 30, wherein the second message is transmitted according to simple mail transfer protocol and is relayed to the calling client device through the simple mail transfer protocol server.

32. A method comprising:
initiating a cellular call with a second client device;
determining if an alternate communication channel is available;
if it is determined that the alternate communication channel is available, transmitting a first message to the second client device, the first message including a first list of at least one candidate internet protocol address for a first client device;
in response to the transmitted message, receiving a second message from the second client device;
establishing a peer-to-peer call over a network connection with the second client device using one of the candidate internet protocol addresses for the first client device and information included in the second message,
wherein the first message is transmitted in response to one of the first client device being activated and a user logging in to the first client device;
wherein the first message includes a text message for exhibition at the second client device asking a user of the second client device to obtain necessary software to complete the peer-to-peer call if necessary; and
dropping the cellular call.

33. An apparatus comprising:
a memory unit configured to store computer code; and
a processor, operatively connected to the memory, the processor configured to execute the computer code to control the apparatus to:
initiate a cellular call with a receiving client device;
determine if an alternate communication channel is available;
if it is determined that the alternate communication channel is available, transmit a first message to the receiving client device, the first message including a first list of at least one candidate internet protocol address for a calling client device;
in response to the transmitted message, receive a second message from the receiving client device;
establish a peer-to-peer call over a network connection with the receiving client device using one of the candidate internet protocol addresses for the calling client device and information included in the second message,
wherein the first message is transmitted in response to one of the calling client device being activated and a user logging in to the calling client device;
wherein the first message includes a text message for exhibition at the receiving client device asking a user of the receiving client device to obtain necessary software to complete the peer-to-peer call if necessary; and
drop the cellular call.

* * * * *

UNITED STATES PATENT AND TRADEMARK OFFICE
CERTIFICATE OF CORRECTION

| | | |
|---|---|---|
| PATENT NO. | : 8,437,757 B2 | |
| APPLICATION NO. | : 11/479211 | |
| DATED | : May 7, 2013 | |
| INVENTOR(S) | : Manish Varma et al. | |

It is certified that error appears in the above-identified patent and that said Letters Patent is hereby corrected as shown below:

In the Claims:

Column 9, Claim 15, Line 13:
Delete "second message wherein" and replace with --second message, wherein--

Column 11, Claim 30, Line 46:
Delete "client device;;" and insert with --client device;--

Signed and Sealed this
Twenty-seventh Day of August, 2013

Teresa Stanek Rea
*Acting Director of the United States Patent and Trademark Office*